A. O. WILLIAMS.
DIFFERENTIAL GEARING FOR MOTOR VEHICLES.
APPLICATION FILED MAY 27, 1918.
1,365,756.
Patented Jan. 18, 1921.
2 SHEETS—SHEET 1.
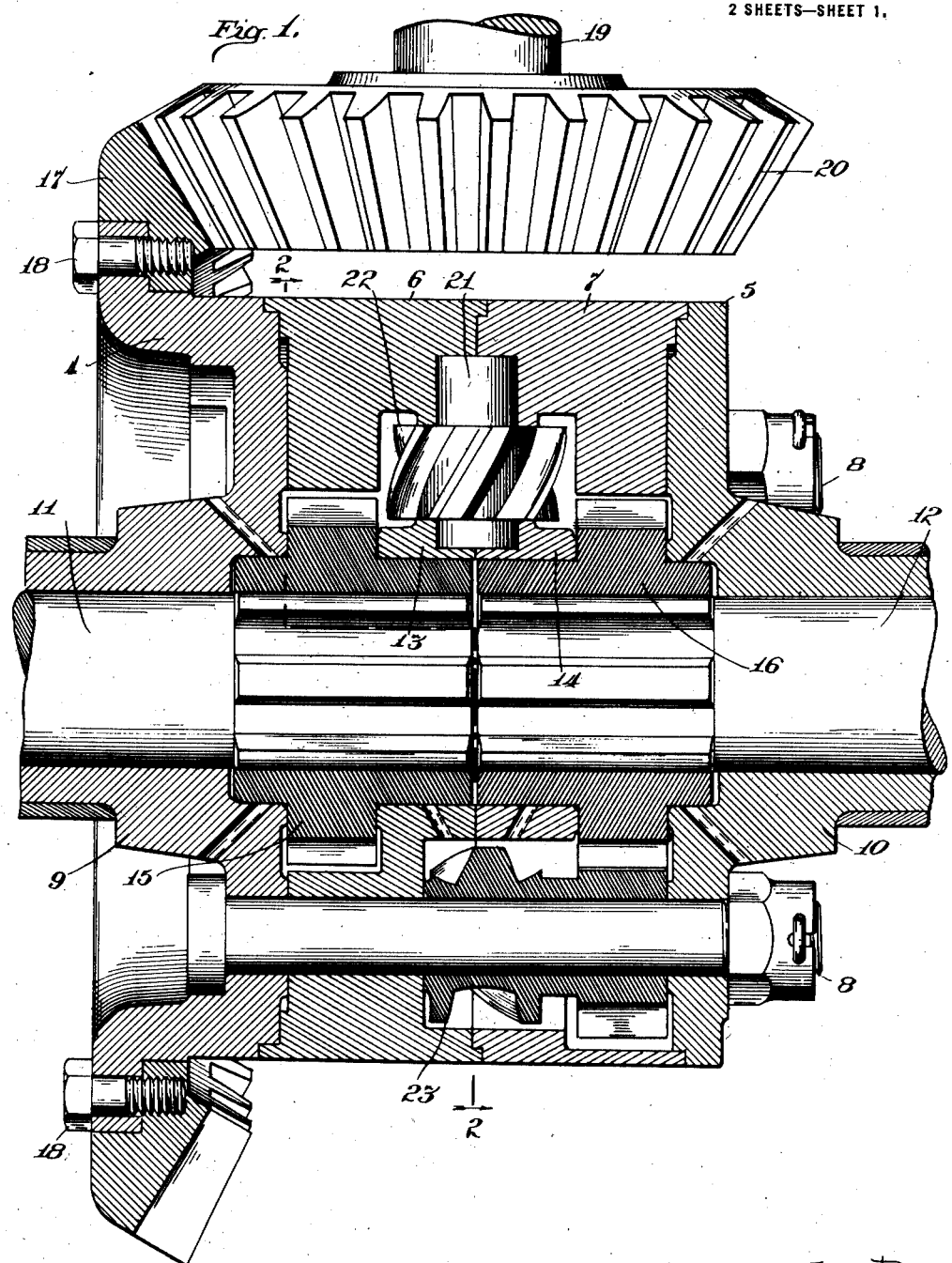
Witness
Fulton Lenoir
Inventor
Alfred O. Williams,
Adams & Jackson.
Attorneys A. O. WILLIAMS.
DIFFERENTIAL GEARING FOR MOTOR VEHICLES.
APPLICATION FILED MAY 27, 1918.
1,365,756.
Patented Jan. 18, 1921.
2 SHEETS—SHEET 2.
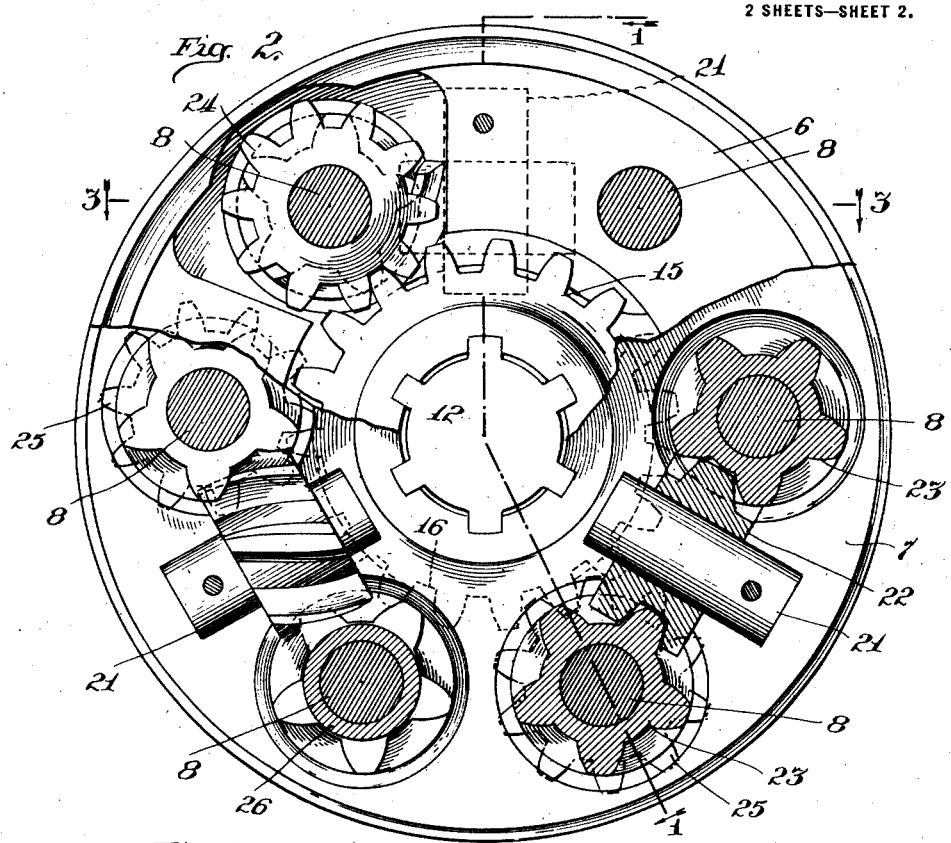
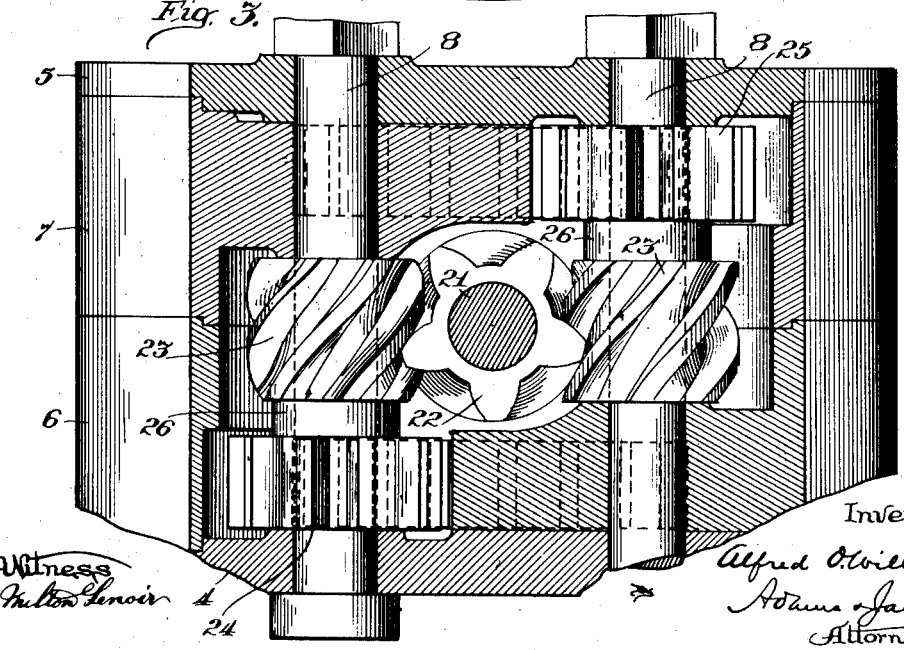

UNITED STATES PATENT OFFICE.

ALFRED O. WILLIAMS, OF SOUTH BEND, INDIANA, ASSIGNOR TO CLARK EQUIPMENT COMPANY, OF BUCHANAN, MICHIGAN, A CORPORATION OF MICHIGAN.

DIFFERENTIAL GEARING FOR MOTOR-VEHICLES.

1,365,756.   Specification of Letters Patent.   Patented Jan. 18, 1921.

Application filed May 27, 1918. Serial No. 236,788.

*To all whom it may concern:*

Be it known that I, ALFRED O. WILLIAMS, a citizen of the United States, and a resident of South Bend, in the county of St. Joseph and State of Indiana, have invented certain new and useful Improvements in Differential Gearing for Motor-Vehicles, of which the following is a specification, reference being had to the accompanying drawings.

My invention relates to differential gearing for motor vehicles, and has for its object to provide certain improvements in differential gearing by which the usual differential action of the driven shafts will be permitted, and in addition, the tendency of the wheel having less traction to "race" will be reduced, without however providing a positive lock. In other words, it is my object to interconnect the members of the differential gearing by a friction creating device which reduces, but does not entirely prevent, the tendency of the wheel having less traction to race. I accomplish this object as illustrated in the drawings and as hereinafter described. What I regard as new is set forth in the claims.

In the accompanying drawings:—

Figure 1 is a section on line 1—1 of Fig. 2, part of the propeller shaft and the drive gear carried thereby being in elevation;

Fig. 2 is a section on line 2—2 of Fig. 1, and

Fig. 3 is a section on line 3—3 of Fig. 2, partly broken away.

Referring to the drawings, 4—5 indicate the end members, and 6—7 the intermediate members of the differential housing, said members being secured together by a series of bolts 8. The end members 4—5 are provided with bearings 9—10, in which are mounted the inner ends of driven shafts 11—12, as shown in Fig. 1, and the intermediate members 6—7 are provided with bearings 13—14, concentric with the bearings 9—10, but spaced apart from them, as shown in Fig. 1, said bearings 13—14 being adapted to receive the inner ends of the journals of spur gears 15—16, which are mounted respectively upon the inner ends of the shafts 11—12 and keyed thereto, so as to rotate therewith. The outer ends of the journals of said gears are mounted in the bearings 9—10, as also shown in Fig. 1. Thus the gears 15—16 are supported at both ends and are held in position by the members of the housing.

17 indicates a ring gear which is formed on or secured to the member 4 of the differential housing, in the construction illustrated, said ring being secured to the housing member 4 by screws 18. 19 indicates the usual propeller shaft, which is driven in any suitable way, as by an internal combustion engine, and is provided with a drive gear 20, which meshes with the ring gear 17, so that the rotation of the propeller shafts rotates the differential housing. 21 indicates a number of radial shafts, preferably three, which are disposed about the axis of the differential at equal intervals, and are journaled in the intermediate members 6—7 of the differential housing, as shown in Figs. 1 and 2. Said shafts carry spiral pinions 22, the pitch of whose teeth is preferably at an angle of 45 degrees, but may vary more or less from that angle according to circumstances. 23 indicates a series of spiral gears which are mounted on the bolts 8 midway of the length thereof, so that they are centrally disposed in the differential housing. Said spiral gears are arranged in pairs at opposite sides of each of the spiral pinions 22 and mesh with said pinions, as shown in Figs. 2 and 3. 24 indicates a series of spur pinions mounted on alternate bolts 8 in position to mesh with the spur gears 15, and 25 indicates a series of similar gears mounted on alternate bolts 8 in position to mesh with the spur gears 16. Thus each of the bolts 8 carries a spur pinion and a spiral gear, which are connected together so as to rotate in unison, and are preferably formed integral with each other by means of a connecting sleeve 26, as best shown in Fig. 3.

When the propeller shaft 19 is driven, the differential housing will be rotated as described, thereby revolving upon bolts 8 the gears carried thereby, and also the intermediate spiral pinions 22, about the axis of the differential. If both drive wheels carried by the shafts 11—12 have equal traction, the spiral pinions 22 operate to hold the spur pinions 24—25 against rotation, and consequently the driven shafts 11—12 are rotated with the differential housing, power being transmitted equally to both traction wheels. If, however, one wheel has less traction than the other, the spiral pinions 22 serve as a friction creating device which prevents all the driving power from being transmitted to the wheel having less traction, thereby preventing racing of the latter wheel, and transmits a considerable portion of the power to the other wheel, without however preventing differential action as between the two wheels. By varying the angle of the teeth of the spiral gears, the relative distribution of power as between the two traction wheels in rounding curves or in places where one wheel has more traction than the other, may be varied, but ordinarily I prefer to use spiral gears having teeth disposed at an angle of about 45 degrees. While I prefer to employ three pairs of spiral gears, a greater or less number of pairs may be employed if desired.

What I claim as my invention, and desire to secure by Letters Patent, is:

1. A differential gearing comprising a housing composed of separable members, means securing said members together, a radial shaft, bearings for the inner and outer ends of said shaft in integral abutting portions of said separable members, axially disposed gears journaled in said separable members and adapted to be connected respectively with shafts at opposite ends of said housing, and differentially operating gears connecting said gears with said radial shaft.

2. A differential gearing comprising a housing composed of separable intermediate members, and end members at opposite sides of said intermediate members, axially disposed bearings carried by said intermediate members, driven shafts mounted axially in said members, a radial shaft having its ends mounted in said intermediate members, and differentially operating gears connecting said radial shaft with said driven shafts.

3. A differential gearing comprising a housing composed of separable intermediate members and end members at opposite sides of said intermediate members, axially disposed bearings carried by said intermediate and end members, driven shafts supported in said bearings, shafts mounted in said end and intermediate members parallel with said driven shafts, and differentially operating gears connecting the latter shafts together and with said driven shafts.

4. A differential gearing comprising a housing composed of separable end and intermediate members, bolts securing said members together, said bolts being parallel with the axis of the differential, spur and spiral gears mounted on said bolts, a radially disposed spiral pinion between said spiral gears and meshing therewith, a drive gear carried by one of the members of said housing, driven shafts journaled in said housing, and spur gears carried by said driven shafts and meshing respectively with the spur gears mounted on said bolts, the inner ends of said driven shafts being supported by bearings in the intermediate members of said housing.

5. A differential gearing comprising a housing composed of separable intermediate members and end members, bolts securing said members together, said bolts being parallel with the axis of the differential, spur and spiral gears formed integral with each other and mounted on said bolts, a radial shaft having its ends mounted in said housing and extending between said spiral gears, a spiral pinion carried by said radial shaft and meshing with said spiral gears, a drive gear carried by one of the members of said housing, driven shafts journaled in said housing, and spur gears carried by said driven shafts and meshing respectively with the spur gears mounted on said bolts.

6. A differential gearing comprising a housing composed of end members and a plurality of intermediate members, bolts securing said members together, said bolts being parallel with the axis of the differential, spur and spiral gears mounted on said bolts, a radial shaft having its ends mounted in the intermediate members of said housing and extending between said spiral gears, a spiral pinion carried by said shaft and meshing with said spiral gears, a drive gear carried by one of the members of said housing, driven shafts journaled in said housing, and spur gears carried by said driven shafts and meshing respectively with the spur gears mounted on said bolts.

7. A differential gearing comprising a housing composed of separable members, bolts securing said members together, said bolts being parallel with the axis of the differential, a drive gear connected with said housing, driven shafts journaled in said housing, spur gears mounted upon said driven shafts, bearings for the inner ends of said spur gears provided by separable members of said housing, a pair of spur gears carried respectively by said bolts and meshing with said first mentioned spur gears respectively, and a spiral pinion operatively connecting said pair of spur gears with each other.

8. A differential gearing comprising a housing composed of separable intermediate members and end members at opposite sides of said intermediate members, axially disposed bearings carried by said intermediate and end members, spur gears journaled in said bearings, driven shafts connected with said spur gears, a radial shaft having its ends mounted in said intermediate members, and gears connecting said radial shaft with said spur gears.

9. A differential gearing comprising a housing composed of separable intermediate members and end members at opposite sides of said intermediate members, bolts connecting said intermediate and end members together, said bolts being parallel with the axis of the differential, axially disposed bearings carried by said intermediate and end members, spur gears journaled in said bearings, driven shafts connected with said spur gears, a radial shaft having its ends mounted in said intermediate members, and gears mounted on said bolts and connecting said radial shaft with said spur gears.

10. A differential gearing comprising a housing composed of separable intermediate members fitted together, end members at opposite sides of said intermediate members, bolts securing said intermediate and end members together, said bolts being parallel with the axis of the differential, spur and spiral gears mounted on said bolts, a radial shaft having its outer end journaled in said intermediate members and extending between said spiral gears, an axially disposed bearing member in which the inner end of said shaft is journaled, a spiral pinion carried by said radial shaft and meshing with said spiral gears, a drive gear carried by one of the members of said housing, driven shafts journaled in said housing, and spur gears carried by said driven shafts and meshing respectively with the spur gears mounted on said bolts.

11. A differential gearing comprising a housing composed of end members and a plurality of intermediate members secured together, axially disposed bearings carried by said intermediate and end members, driven shafts supported by said bearings, and differentially operating gears connecting said driven shafts with the housing.

12. A differential gearing comprising a housing composed of a plurality of intermediate members and end members secured together, axially disposed inner and outer bearings integral with said intermediate and end members respectively, gears journaled in said bearings, and adapted to be connected, respectively, with shafts at opposite ends of said housing, and differentially operating gears connecting said gears with the housing.

13. A differential gearing comprising a housing composed of a plurality of intermediate members and end members secured together, axially disposed bearings carried by said intermediate and end members, a radially disposed gear journaled in said intermediate members, gears journaled in said axially disposed bearings at opposite ends of the housing, and planetary gears mounted in the housing and operatively connecting the latter gears respectively with said radially disposed gear.

14. A differential gearing comprising two separable intermediate members and two end members arranged in series forming a housing, a gear journaled in bearings formed integral with two of said housing members, a second gear in alinement with said first-named gear and journaled in bearings formed integral with the other two of said housing members, and planetary gearing mounted in said housing and operatively connecting said two gears.

15. A differential gearing comprising two separable intermediate members and two end members arranged in series forming a housing, means for rotating said housing about its central longitudinal axis, two gears revolubly mounted in said housing concentrically therewith, bolts passing respectively through recesses in said intermediate members adjacent to the opposite end members respectively, the bolt passing through each intermediate member being supported by bearings provided by the adjacent end member and by the other intermediate member, a pinion in each of said recesses mounted on the bolt which passes therethrough and meshing with the adjacent gear, and planetary gearing mounted in said housing and operatively connecting the pinions mounted on said bolts.

16. A differential gearing comprising two separable intermediate members and two end members arranged in series forming a housing, means for rotating said housing about its central longitudinal axis, two gears revolubly mounted in said housing concentrically therewith, bolts passing respectively through recesses in said intermediate members adjacent to the opposite end members respectively, the bolt passing through each intermediate member being supported by bearings provided by the adjacent end member and by the other intermediate member, a pinion in each of said recesses mounted on the bolt which passes therethrough, and meshing with the adjacent gear, spiral pinions on said bolts and connected respectively with said pinions, and a radially-disposed spiral pinion revolubly mounted in said housing and meshing with the spiral pinions mounted on said bolts.

17. In a differential, the combination of a housing comprising two end members and two intermediate members, a pair of bolts securing said housing members together, one of the bolts of said pair having a support in one of said intermediate members and the other bolt having a support in the other of said intermediate members, two shafts extending into said housing and having their inner end portions journaled therein, two gears fixed on said shafts respectively within said housing, two pinions mounted on said bolts and meshing with said gears respectively, and spiral gear mechanism connecting said two pinions adapted to permit said pinions to rotate in opposite directions.

ALFRED O. WILLIAMS,